(12) United States Patent
Feng et al.

(10) Patent No.: US 12,493,640 B2
(45) Date of Patent: Dec. 9, 2025

(54) TEXT PROCESSING METHOD AND APPARATUS, DEVICE, AND MEDIUM

(71) Applicant: BEIJING YOUZHUJU NETWORK TECHNOLOGY CO., LTD., Beijing (CN)

(72) Inventors: Jiangtao Feng, Beijing (CN); Jiaze Chen, Beijing (CN); Hao Zhou, Beijing (CN); Lei Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 373 days.

(21) Appl. No.: 18/262,472

(22) PCT Filed: Jan. 20, 2022

(86) PCT No.: PCT/CN2022/072895
§ 371 (c)(1),
(2) Date: Jan. 26, 2024

(87) PCT Pub. No.: WO2022/156730
PCT Pub. Date: Jul. 28, 2022

(65) Prior Publication Data
US 2025/0363151 A1    Nov. 27, 2025

(30) Foreign Application Priority Data
Jan. 22, 2021    (CN) .......................... 202110088894.4

(51) Int. Cl.
*G06F 16/00* (2019.01)
*G06F 16/332* (2019.01)
(Continued)

(52) U.S. Cl.
CPC ........ *G06F 16/3344* (2019.01); *G06F 16/332* (2019.01); *G06F 16/353* (2019.01); *G06F 40/289* (2020.01); *G06F 40/30* (2020.01)

(58) Field of Classification Search
CPC .................................................. G06F 16/3344
See application file for complete search history.

(56) References Cited

U.S. PATENT DOCUMENTS

| 2007/0112839 A1 | 5/2007 | Bjarnestam et al. |
| 2010/0185689 A1 | 7/2010 | Hu et al. |

(Continued)

FOREIGN PATENT DOCUMENTS

| CN | 108241667 A | 7/2018 |
| CN | 109271514 A | 1/2019 |

(Continued)

OTHER PUBLICATIONS

International Search Report issued Apr. 19, 2022 for International Application No. PCT/CN2022/072895, English translation (4 pages).

(Continued)

*Primary Examiner* — Ajith Jacob

(57) ABSTRACT

A text processing method includes the steps described below. Multiple texts in a preset text database are acquired, and at least one keyword is extracted from each text. Based on each keyword which is extracted, a keyword table is established. A mapping relationship between each keyword and a phrase element in a phrase set corresponding to a text in which each keyword is located is the same as a mapping relationship between the text in which each keyword is located and the phrase element in the corresponding phrase set. A keyword pair having an association relationship is determined in the keyword table. A phrase element in a phrase set corresponding to each keyword in the keyword pair are updated. According to a mapping relationship between each keyword and phrase elements in an updated (Continued)

Acquire multiple texts in a preset text database and extract at least one keyword from each text — S110

Establish, based on each keyword which is extracted, a keyword table — S120

Determine a keyword pair having an association relationship in the keyword table; upgrade a phrase element in a phrase set corresponding to each keyword in the keyword pair; and establish, according to a mapping relationship between each keyword and a phrase element in an updated phrase set, a relationship chart between a keyword and a phrase — S130 phrase set, a relationship chart between a keyword and a phrase is established.

20 Claims, 2 Drawing Sheets

(51) Int. Cl.
*G06F 16/334* (2025.01)
*G06F 16/353* (2025.01)
*G06F 40/289* (2020.01)
*G06F 40/30* (2020.01)

(56) References Cited

U.S. PATENT DOCUMENTS

| | | | |
|---|---|---|---|
| 2011/0071973 | A1 | 3/2011 | Zhang |
| 2016/0350404 | A1 | 12/2016 | Smith et al. |
| 2018/0181988 | A1 | 6/2018 | Wei et al. |
| 2019/0155944 | A1 | 5/2019 | Mahata et al. |
| 2020/0034362 | A1 | 1/2020 | Galitsky |
| 2023/0087132 | A1* | 3/2023 | Rosno .................. G06F 16/316 707/769 |

FOREIGN PATENT DOCUMENTS

| | | |
|---|---|---|
| CN | 110019669 A | 7/2019 |
| CN | 110321561 A | 10/2019 |
| CN | 110362827 A | 10/2019 |
| CN | 110472005 A | 11/2019 |
| CN | 110543574 A | 12/2019 |
| CN | 110633464 A | 12/2019 |
| CN | 110795911 A | 2/2020 |
| CN | 111274358 A | 6/2020 |
| CN | 11709248 A | 9/2020 |
| CN | 111831804 A | 10/2020 |
| CN | 112819512 A | 5/2021 |
| WO | 2004010331 A1 | 1/2004 |

OTHER PUBLICATIONS

First Office Action issued Oct. 28, 2022 in Chinese Application No. 202110088894.4, English translation (9 pages).

Jian Cao et al., "A Way to Improve Graph-Based Keyword Extraction," IEEE 2015, pp. 166-170 (5 pages).

Lang Dongdong et al., "Design and Implementation of a Key Phrases Extraction Scheme in the Text Based on LDA and Textrank," Computer Applications and Software, vol. 35, No. 3, Mar. 2018, pp. 54-60, English Abstract (7 pages).

* cited by examiner

TEXT PROCESSING METHOD AND APPARATUS, DEVICE, AND MEDIUM

CROSS-REFERENCE TO RELATED APPLICATION(S)

This is a national stage application filed under 37 U.S.C. 371 based on International Patent Application No. PCT/CN2022/072895, filed Jan. 20, 2022, which claims priority to Chinese Patent Application No. 202110088894.4 filed with the China National Intellectual Property Administration (CNIPA) on Jan. 22, 2021, the disclosure of which is incorporated herein by reference in its entirety.

TECHNICAL FIELD

Embodiments of the present disclosure relate to the field of computer applications, for example, a text processing method and an apparatus, a device, and a medium.

BACKGROUND

In advertising or other domains where a target item needs to be described in concise language, corresponding phrase text content is often sourced from a copywriting database. To expand a phrase copywriting database of the target item, phrase extraction is generally performed from existing longer relevant text, or a neural network model is trained to generate, according to an input text, related phrases in a manner where the model generates phrases.

However, related solutions have limitations. For instance, phrase extraction methods can only extract words from existing text, resulting in a limited amount of words. Furthermore, words generated by the neural network model sometimes fail to adhere to language logic, necessitating further model training.

SUMMARY

Embodiments of the present disclosure provide a text processing method and an apparatus, a device, and a medium to obtain more phrases that can describe target items on the basis of the existing text-phrase mapping relationship. In this manner, applicable phrase corpus resources are rendered more abundant.

In a first aspect, embodiments of the present disclosure provide a text processing method. The method includes the steps described below.

A plurality of texts in a preset text database are acquired, and at least one keyword is extracted from each text of the plurality of texts. Each text in the preset text database corresponds to a phrase set. A phrase element in the respective phrase set is a phrase having a mapping relationship with a corresponding text in the preset text database.

Based on each keyword which is extracted, a keyword table is established. A mapping relationship between the each keyword and a phrase element in a phrase set corresponding to a text in which the each keyword is located is identical to a mapping relationship between the text in which the each keyword is located and the phrase element in the corresponding phrase set.

A keyword pair having an association relationship is determined in the keyword table. A phrase element in a phrase set corresponding to each keyword in the keyword pair are updated. According to a mapping relationship between the each keyword and a phrase element in an updated phrase set, a relationship chart between a keyword and a phrase is established.

In a second aspect, embodiments of the present disclosure also provide a text processing apparatus. The apparatus includes a keyword extraction module, a word table builder, and a word relationship chart building module.

The keyword extraction module is configured to acquire a plurality of texts in a preset text database, and extract at least one keyword from each text of the plurality of texts, wherein each text in the preset text database corresponds to a respective phrase set, and a phrase element in the phrase set is a phrase having a mapping relationship with a corresponding text in the preset text database.

The word table builder is configured to establish, based on each keyword which is extracted, a keyword table, wherein a mapping relationship between the each keyword and a phrase element in a phrase set corresponding to a text in which the each keyword is located is identical to a mapping relationship between the text in which the each keyword is located and a phrase element in a corresponding phrase.

The word relationship chart building module is configured to determine a keyword pair having an association relationship in the keyword table, update a phrase element in a phrase set corresponding to each keyword in the keyword pair, and establish, according to a mapping relationship between each keyword and a phrase element in an updated phrase set, a relationship chart between a keyword and a phrase.

In a third aspect, embodiments of the present disclosure also provide an electronic device. The device includes one or more processors and a memory.

The memory is configured to store one or more programs.

When the one or more programs are executed by the one or more processors, the one or more processors are caused to perform the text processing method described in any of the embodiments in this disclosure.

In a fourth aspect, embodiments of the present disclosure also provide a computer storage medium storing a computer program, when executing the computer program, a processor performs the text processing method described in any of the embodiments in this disclosure.

BRIEF DESCRIPTION OF DRAWINGS

The same or similar reference numerals throughout the drawings denote the same or similar elements. It should be understood that the drawings are schematic and that the components and elements are not necessarily drawn to scale.

DETAILED DESCRIPTION

Embodiments of the present disclosure are described in more detail hereinafter with reference to the drawings. The drawings illustrate some embodiments of the present disclosure, but it should be understood that the present disclosure may be implemented in various manners and should not be construed as limited to the embodiments set forth herein. These embodiments are provided for a more thorough and complete understanding of the present disclosure. It should be understood that the drawings and embodiments of the present disclosure are merely illustrative and are not intended to limit the scope of the present disclosure.

It should be understood that steps described in method embodiments of the present disclosure may be performed in sequence and/or in parallel. Additionally, the method embodiments may include additional steps and/or omit some of the illustrated steps. The scope of the present disclosure is not limited in this respect.

The term "include" and variations thereof used herein refer to "including, but not limited to". The term "based on" refers to "at least partially based on". The term "an embodiment" refers to "at least one embodiment". The term "another embodiment" refers to "at least one another embodiment". The term "some embodiments" refers to "at least some embodiments". Definitions of other terms are given in the description hereinafter.

It should be noted that concepts such as "first" and "second" in the present disclosure are used to distinguish between apparatuses, between modules, or between units and are not intended to limit the order or mutual dependence of the functions performed by these apparatuses, modules, or units.

It should be noted that "one" and "multiple" mentioned in the present disclosure are not limiting but illustrative and should be construed by those skilled in the art as "one or more" unless otherwise specified in the context.

The names of messages or information exchanged between multiple apparatuses in the embodiments of the present disclosure are used only for illustrative purposes and are for limiting the scope of these messages or information.

Figure 1:
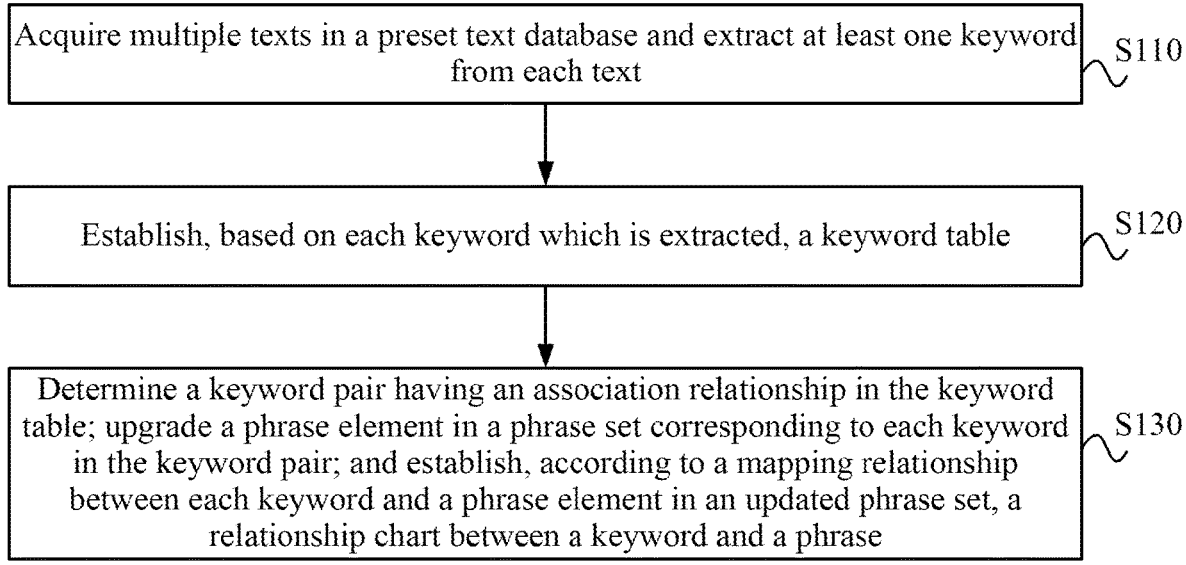
FIG. 1 is a flowchart of a text processing method according to an embodiment of the present disclosure.

FIG. 1 is a flowchart of a text processing method according to an embodiment of the present disclosure. This embodiment of the present disclosure is applicable to expanding, based on the existing text-phrase mapping relationship, the mapping relationship between texts and phrases. The method may be performed by a text processing apparatus, for example, performed by software and/or hardware in an electronic device.

As shown in FIG. 1, the text processing method provided by this embodiment of the present disclosure includes the steps described below.

S110: Multiple texts in a preset text database are acquired, and at least one keyword is extracted from each text.

The text content in the preset text database may be a title text of item description or a detailed text of the item description. Each title or each detailed text is a piece of text data. Each text in the preset text database corresponds to a respective phrase set where an element is a phrase having a mapping relationship with a corresponding text. The mapping relationship may be understood as a link relationship where a corresponding text can be retrieved or linked through a phrase element in a phrase set, and a corresponding phrase element can also be found through a text query. For example, a phrase in a phrase set is a retrieval keyword by which a corresponding text, that is, an item described by the corresponding text, can be retrieved.

Keyword extraction from texts may be achieved by a keyword extraction algorithm such as TextRank or term frequency-inverse document frequency (TF-IDF).

S120: Based on each keyword which is extracted, a keyword table is established.

A mapping relationship between each keyword and a phrase element in a phrase set corresponding to a text in which the keyword is located is identical to a mapping relationship between the text in which the respective keyword is located and the phrase element in the corresponding phrase set. It can be understood that by a keyword of each text, elements in a phrase set corresponding to a text in which the keyword is located can be mapped and connected.

This step integrates extracted keywords into a word table. Each text also corresponds to an identification of an application field or a category because the text content is a title text of item description or a detailed text of the item description, and described items are generally classified into a certain category, such as a cosmetic item, a mother and child item, or health food. Accordingly, an identification column may also be configured in the keyword table to indicate the application field or scope of a keyword.

Of course, it is conceivable that in the keyword table, keywords with the same text but different application scopes exist, or keywords with the same text and the same application scope exist. These words exist in the keyword table so that data such as the number of occurrences of the same keyword can be further gathered.

S130: A keyword pair having an association relationship is determined in the keyword table. A phrase element in a phrase set corresponding to each keyword in the keyword pair are updated. According to a mapping relationship between each keyword and a phrase element in an updated phrase set, a relationship chart between a keyword and a phrase is established.

A text or a phrase is a description of a target item. Therefore, to enable the target item to match more phrases, each keyword may be used as a transit node for establishing mapping links between a text and other texts or phrases in this embodiment.

For example, a keyword pair having an association relationship is first determined in the keyword table. The association relationship may refer to being literally identical or semantically similar. Any keyword in the keyword table may be selected and then matched with other keywords in the keyword table. When the same keyword and a keyword whose semantic similarity meets a preset condition are matched, a keyword pair having an association relationship may be formed.

Each keyword in the keyword pair may be a relay node to each other. A phrase element in a phrase set corresponding to each keyword are upgraded to a phrase element to which all keywords in the keyword pair can be mapped.

Exemplarily, phrases corresponding to text 1 are abc, aabb, and bcdd, and keywords of text 1 are W1 and W2; then, the text 1 has a mapping relationship with the phrases abc, aabb, and bcdd; moreover, the keywords W1 and W2 separately have a mapping relationship with the keywords abc, aabb, and bcdd. Phrases corresponding to text 2 are abc, apm, and pdd, and keywords of text 2 are W1 and W3. Similarly, text 2 has a mapping relationship with the phrases abc, apm, and pdd. The keywords W1 and W3 separately have a mapping relationship with the keywords abc, apm, and pdd. Text 1 and text 2 have the same keyword W1, and then the two W1s may form a keyword pair. Phrase elements in phrase sets corresponding to the two W1s are updated to abc, aabb, bcdd, apm, and pdd. It can be understood that W3, W2, and W1 correspond to the same phrase set, and W3 and W2 can also map to an updated phrase set.

After expanding the mapping relationship between a keyword and a phrase, a relationship chart between the keyword and the phrase can be established according to a mapping relationship between each keyword and phrase elements in an updated phrase set. For example, according to the mapping relationship between each keyword and the phrase elements in the updated phrase set, a connection line between each keyword and each phrase element is established to form a relationship chart. Therefore, when it is necessary to match a corresponding phrase copywriting for a certain text, the corresponding phrase can be obtained by extraction of a keyword from the text and a query of the relationship chart based on the keyword. Moreover, based on the relationship chart with an expanded mapping relationship, more applicable phrases can be matched for a target text.

In the technical solution of this embodiment of the present disclosure, at least one keyword is extracted from each text in a preset text database. Each text in the preset text database corresponds to a phrase set where a phrase element is a phrase having a mapping relationship with a corresponding text. Then, based on each extracted keyword, a keyword table is established. A mapping relationship between each keyword and a phrase element in a phrase set corresponding to a text in which the respective keyword is located is the same as a mapping relationship between the text in which the respective keyword is located and the phrase element in the corresponding phrase set. Finally, a keyword pair having an association relationship in a keyword table is determined. With a keyword as a bridge, phrase elements in a phrase set corresponding to each keyword in the keyword pair are updated. According to a mapping relationship between each keyword in the keyword pair and phrase elements in an updated phrase set, a relationship chart between a keyword and a phrase is established. In this manner, a limited amount of phrases extracted from existing texts are avoided in the existing art, and more phrases that can describe target items can be obtained on the basis of the existing text-phrase mapping relationship. Thus, the resources for applicable phrase corpus are rendered more abundant.

This embodiment, based on the preceding embodiment, optimizes the keyword table and improves the matching effect between a text and phrases after the mapping relationship is expanded. This method and the text processing method proposed in the preceding embodiment belong to the same inventive concept. For technical details not described in detail in this embodiment, reference may be made to the preceding embodiment.

Figure 2:
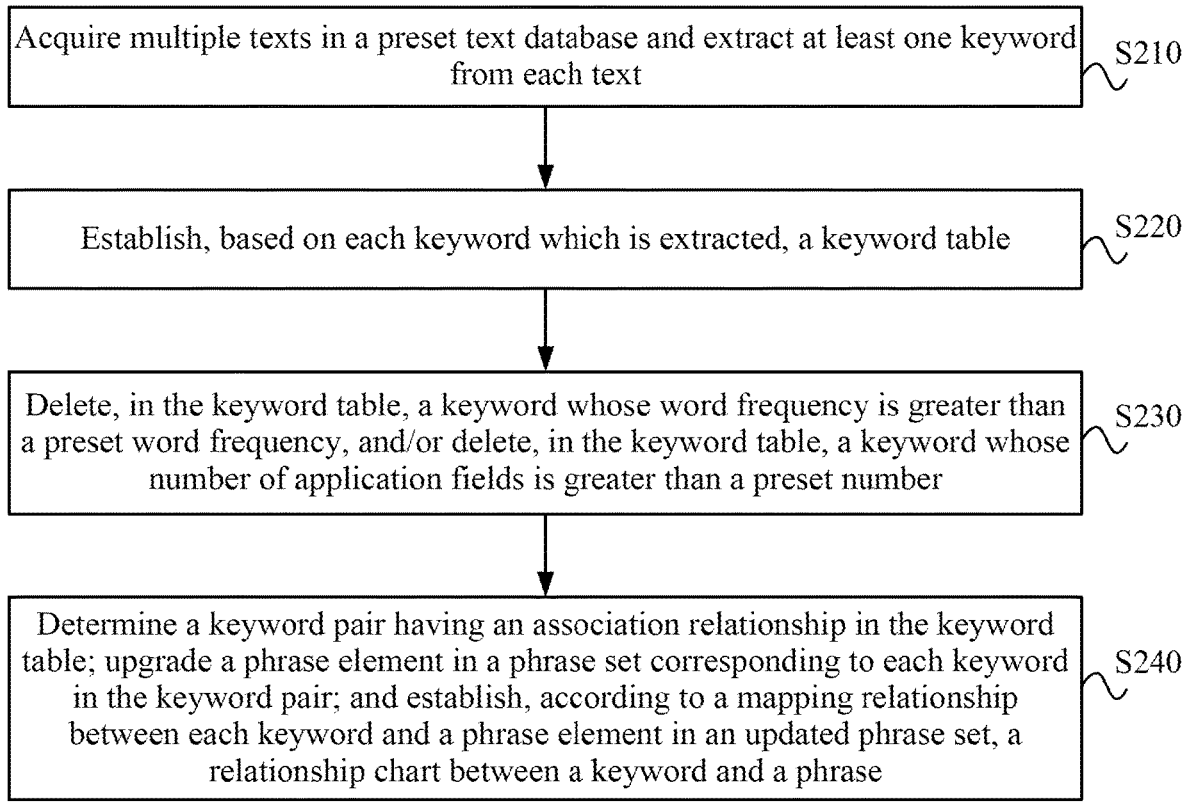
FIG. 2 is a flowchart of a text processing method according to another embodiment of the present disclosure.

FIG. 2 is a flowchart of a text processing method according to another embodiment of the present disclosure. The text processing method provided in this embodiment of the present disclosure includes the steps described below.

S210: Multiple texts in a preset text database are acquired, and at least one keyword is extracted from each text.

The text content in the preset text database may be a title text of item description or a detailed text of the item description. Each title or each detailed text is a piece of text data. Each text in the preset text database corresponds to a respective phrase set where an element is a phrase having a mapping relationship with a corresponding text.

For example, in this embodiment, a process of keyword extraction based on TF-IDF may refer to the following steps:

First, each text is segmented into words, and a first inverse document frequency of each word in a word segmentation result in all texts in the preset text database and a second inverse document frequency of the each word in a classification field corresponding to a text in which the each word is located are calculated. A respective importance parameter of the each word is determined according to a word frequency of the each word in the text in which the word is located, the first inverse document frequency, and the second inverse document frequency. That is, a product of the word frequency of the each word in the text in which the word is located, the first inverse document frequency, and the second inverse document frequency is used as a respective importance parameter of the each word. Finally, the respective importance parameter is sorted, and according to the sorting result, a preset number of words are selected as keywords. For example, in the word segmentation result of a text, words whose importance parameter values rank in the top two are selected as keywords of the text.

Inverse document frequency (IDF) is a measure of the general importance of a word. For word A, the first inverse document frequency is the logarithm of the ratio of the total number of texts in the preset text database to the number of texts containing word A in the preset text database; the second inverse document frequency is the logarithm of the ratio of the total number of texts in the preset text database in the application field or category corresponding to the text in which word A is located to the number of texts containing the word A in the application field or category corresponding to the text in which word A is located. It is understandable that the importance of the same keyword in different fields is different. For example, the importance of "Snow White" in all texts is different from that in the toy field or that in related texts of Snow White movie reviews, and inverse document frequency is also different. In this embodiment, the importance of a word is considered from different perspectives. Therefore, for each word in the segmentation result, the first inverse document frequency and the second inverse document frequency are separately calculated.

After the first inverse document frequency and the second inverse document frequency are calculated, the product of the word frequency of each word in the text to be processed, the first inverse document frequency, and the second inverse document frequency can be used as a respective importance parameter of the each word. According to the ranking of a respective importance parameter value of each word, two (or another number) with the highest values can be selected as keywords of the text to be processed.

S220: Based on a respective keyword, a keyword table is established.

A mapping relationship between the respective keyword and a phrase element in a phrase set corresponding to a text in which the respective keyword is located is the same as a mapping relationship between the text in which the respective keyword is located and the phrase element in the corresponding phrase set. This step integrates extracted keywords into a word table.

S230: In the keyword table, a keyword whose word frequency is greater than a preset word frequency is deleted, and in the keyword table, a keyword whose number of application fields is greater than a preset number is deleted.

In this step, the keyword table is optimized. After all keywords are integrated into a keyword table, words whose word frequency rank meets a preset condition can be deleted in the keyword table. For example, words with the top five percent of word frequency can be deleted because some keywords whose word frequency is high are likely to be commonly used vocabulary, and when subsequent keyword-phrase mapping is performed, phrases that cannot be used across fields or categories are likely to be matched with texts. It is also possible, according to industry classification standards, to delete words that cross level-one industries (that is, words that can be used in multiple application fields) to avoid erroneous mapping relationships of texts in different fields.

S240: A keyword pair having an association relationship is determined in the keyword table. A phrase element in a phrase set corresponding to each keyword in the keyword pair are updated. According to a mapping relationship between each keyword and a phrase element in an updated phrase set, a relationship chart between a keyword and a phrase is established.

In this embodiment, after a relationship chart between a keyword and a phrase is established according to a mapping relationship between the respective keyword and phrase elements in an updated phrase set, the relationship chart may be further optimized. A mapping relationship pair composed of a keyword with a smaller number of occurrences in the chart and phrases is deleted.

The reason is as follows: Considering the amount of text data in the preset database and the expansion of phrase mapping, a keyword may have a mapping relationship with more phrases, and a keyword may have multiple mapping relationships with a phrase in the relationship chart. In a relationship chart formed by connecting lines between a respective keyword and each phrase element, a keyword may be connected to multiple phrases, and a keyword may be connected to a phrase via multiple connection lines. This is because in a text database, elements in phrase sets corresponding to different texts may be partially overlapped, and different texts may have the same keywords. With a keyword as a connection bridge, mapping between some keywords and phrases may be overlapped. However, in the case of only one connection line between a keyword and a phrase or a combination in which the number of connection lines is less than a preset value, such a combination may be a low-probability and accidental combination that can be removed to maintain a certain correlation between a keyword and a phrase. In the technical solution of this embodiment of the present disclosure, at least one keyword is extracted from each text in a preset text database. Each text in the preset text database corresponds to a phrase set where a phrase element is a phrase having a mapping relationship with a corresponding text. Then, based on a respective extracted keyword, a keyword table is established. The keyword table is optimized by removal of words with high word frequency and cross-field applications. Finally, a keyword pair having an association relationship in a keyword table is determined. Phrase elements in a phrase set corresponding to a respective keyword in the keyword pair are updated. According to a mapping relationship between the respective keyword and phrase elements in an updated phrase set, a relationship chart between a keyword and a phrase is established and optimized. In this manner, a limited amount of phrases extracted from existing texts are avoided in the existing art, more phrases that can describe target items can be obtained on the basis of the existing text-phrase mapping relationship, and matching of generic texts across fields is avoided. Thus, applicable phrase corpus resources are rendered more abundant.

Figure 3:
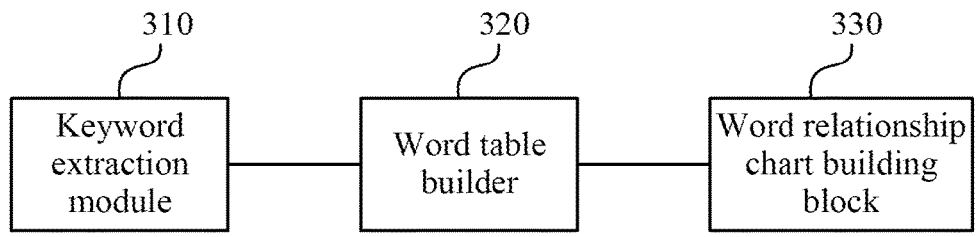
FIG. 3 is a diagram illustrating the structure of a text processing apparatus according to an embodiment of the present disclosure.

FIG. 3 is a diagram illustrating the structure of a text processing apparatus according to an embodiment of the present disclosure. This embodiment of the present disclosure is applicable to a situation where the text processing methods provided in the preceding embodiments can be implemented by the text processing apparatus provided in the present disclosure.

As shown in FIG. 3, the text processing apparatus in this embodiment of the present disclosure includes a keyword extraction module 310, a word table builder 320, and a word relationship chart building block 330.

The keyword extraction module 310 is configured to acquire multiple texts in a preset text database, and extract at least one keyword from each textacquire multiple texts in a preset text database and extract at least one keyword from each text. Each text in the preset text database corresponds to a respective phrase set. A phrase element in the respective each phrase set is a phrase having a mapping relationship with a corresponding text. The word table builder 320 is configured to establish, based on each keyword which is extracted, a keyword table. A mapping relationship between the respective keyword and a phrase element in a phrase set corresponding to a text in which the respective keyword is located is the same as a mapping relationship between the text in which the respective keyword is located and the phrase element in the corresponding phrase set. The word relationship chart building module 330 is configured to determine a keyword pair having an association relationship in the keyword table, update a phrase element in a phrase set corresponding to each keyword in the keyword pair, and establish, according to a mapping relationship between each keyword and a phrase element in an updated phrase set, a relationship chart between a keyword and a phrase.

In the technical solution of this embodiment, at least one keyword is extracted from each text in a preset text database. Each text in the preset text database corresponds to a phrase set where a phrase element is a phrase having a mapping relationship with a corresponding text. Then, based on each extracted keyword, a keyword table is established. A mapping relationship between each keyword and a phrase element in a phrase set corresponding to a text in which each keyword is located is the same as a mapping relationship between the text in which each keyword is located and the phrase element in the corresponding phrase set. Finally, a keyword pair having an association relationship in a keyword table is determined. Phrase elements in a phrase set corresponding to each keyword in the keyword pair are updated. According to a mapping relationship between each keyword and phrase elements in an updated phrase set, a relationship chart between a keyword and a phrase is established. This configuration avoids the limitation of extracting a limited amount of phrases from existing texts in the related art, and allows for obtaining more phrases that can describe target items based on the existing text-phrase mapping relationship, thus making the applicable phrase corpus resources more abundant.

The word relationship chart building module 330 is configured to match, in the keyword table, the same keyword and a keyword whose semantic similarity meets a preset condition, and acquire a keyword pair having an association relationship; and update phrase elements in a phrase set corresponding to each keyword in the keyword pair to phrase elements to which all keywords in the keyword pair can be mapped.

The word table builder 320 is also configured to delete, in the keyword table, a keyword whose word frequency is greater than a preset word frequency, and/or delete, in the keyword table, a keyword whose number of application fields is greater than a preset number.

The word relationship chart building module 330 is also configured to establish, according to the mapping relationship between each keyword and the phrase elements in the updated phrase set, a connection line between each keyword and each phrase element to form a relationship chart.

The word relationship chart building module 330 is also configured to delete, in the relationship chart, a mapping combination of a keyword and a phrase element between which the number of connection lines is smaller than a preset value.

The keyword extraction module 310 is configured to segment the texts and calculate a first inverse document frequency of each word in a word segmentation result in all texts in the preset text database and a second inverse document frequency of the each word in a classification field corresponding to a text in which the each word is located; determine a respective importance parameter of the each word according to a word frequency of the each word in the text in which the each word is located, the first inverse document frequency, and the second inverse document frequency; and sort the respective importance parameter, and select, according to the sorting result, a preset number of words as keywords.

The keyword extraction module 310 is also configured to use the product of the word frequency of the each word in the text in which the word is located, the first inverse document frequency, and the second inverse document frequency as a respective importance parameter of the each word.

The text processing apparatus provided in this embodiment of the present disclosure and the text processing methods provided in the preceding embodiments belong to the same concept. For technical details not described in detail in this embodiment of the present disclosure, reference may be made to the preceding embodiments, and this embodiment of the present disclosure has the same beneficial effects as the preceding embodiments.

Figure 4:
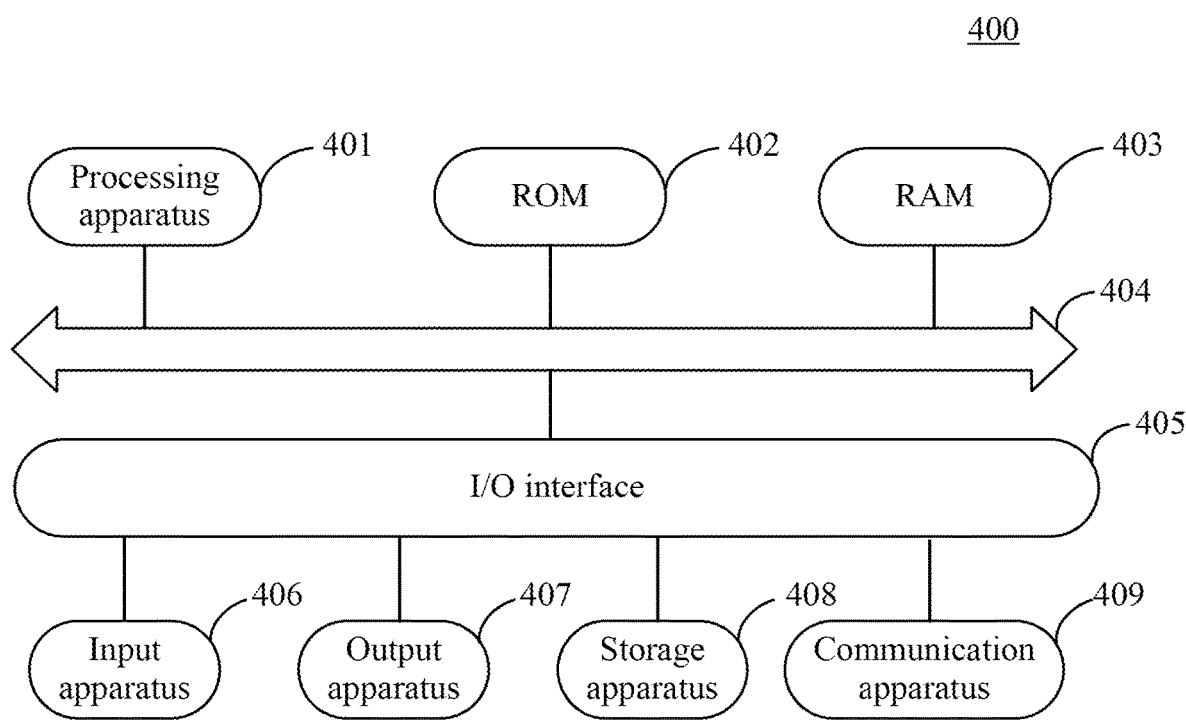
FIG. 4 is a diagram illustrating the structure of an electronic device according to an embodiment of the present disclosure.

Referring to FIG. 4, FIG. 4 is a diagram illustrating the structure of an electronic device 400 applicable to implementing the embodiments of the present disclosure. The electronic device in the embodiments of the present disclosure may include but is not limited to, a mobile terminal such as a mobile phone, a laptop, a digital broadcast receiver, a personal digital assistant (PDA), a PAD, a portable media player (PMP), and a vehicle-mounted terminal (for example, a vehicle-mounted navigation terminal) and a fixed terminal such as a digital TV, and a desktop computer. The electronic device shown in FIG. 4 is merely an example and should not impose any limitation to the function and usage scope of embodiments of the present disclosure.

As shown in FIG. 4, the electronic device 400 may include a processing apparatus 401 (such as a central processing unit or a graphics processor). The processing apparatus 401 may perform various appropriate actions and processing according to a program stored in a read-only memory (ROM) 402 or a program loaded into a random access memory (RAM) 403 from a storage apparatus 406. The RAM 403 also stores various programs and data required for the operation of the electronic device 400. The processing apparatus 401, the ROM 402, and the RAM 403 are connected to each other through a bus 404. An input/output (I/O) interface 405 is also connected to the bus 404.

Generally, the following apparatus may be connected to the I/O interface 405: an input apparatus 404 such as a touch screen, a touch pad, a keyboard, a mouse, a camera, a microphone, an accelerometer, and a gyroscope; an output apparatus 407 such as a liquid crystal display (LCD), a speaker, and a vibrator; a storage apparatus 406 such as a magnetic tape and a hard disk; and a communication apparatus 409. The communication apparatus 409 may allow the electronic device 400 to perform wireless or wired communication with other devices to exchange data. FIG. 4 shows the electronic device 400 having various apparatuses, but it should be understood that it is not necessary to implement or be equipped with all the shown apparatuses. Alternatively, the electronic device 400 may implement or be equipped with more or fewer apparatuses.

In particular, according to this embodiment of the present disclosure, the process described above with reference to the flowchart may be implemented as a computer software program. For example, this embodiment of the present disclosure includes a computer program product. The computer program product includes a computer program carried in a non-transitory computer-readable medium. The computer program includes program codes for performing the method shown in the flowchart. In such an embodiment, the computer program may be downloaded and installed from the network through the communication apparatus 409, or may be installed from the storage apparatus 406, or may be installed from the ROM 402. When the computer program is executed by the processing apparatus 401, the preceding functions defined in the methods of the embodiments of the present disclosure are performed.

It should be noted that the preceding computer-readable medium of the present disclosure may be a computer-readable signal medium, a computer-readable storage medium, or any combination of the computer-readable signal medium and the computer-readable storage medium. The computer-readable storage medium may be, but is not limited to, an electrical, magnetic, optical, electromagnetic, infrared, or semiconductor system, apparatus, or device, or any combination thereof. Concrete examples of the computer-readable storage media may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a base band or as a part of a carrier wave. Computer-readable program codes are carried in the data signal. Such propagated data signals may take a variety of forms, including, but not limited to, electromagnetic signals, optical signals, or any suitable combination thereof. The computer-readable signal medium may also be any computer-readable medium other than a computer-readable storage medium. The computer-readable signal medium may send, propagate, or transmit a program used by or in conjunction with an instruction execution system, apparatus, or device. The program codes contained on the computer-readable medium may be transmitted on any suitable medium, including, but not limited to, a wire, an optical cable, radio frequency (RF), or any suitable combination thereof.

In some embodiments, the client and the server can communicate by using any currently known or future-developed network protocol such as HyperText Transfer Protocol (HTTP) and can be interconnected by any form or medium of digital data communication (for example, a communication network). Examples of the communication network include a local area network (LAN), a wide area network (WAN), an interconnected network (for example, the Internet), an end-to-end network (for example, an ad hoc end-to-end network), and any currently known or future-developed network.

The preceding computer-readable medium may be included in the preceding electronic device, or may exist alone without being assembled into the electronic device.

The preceding computer-readable medium carries one or more programs. When executing the one or more programs, the electronic device performs the steps described below.

Multiple texts in a preset text database are acquired, and at least one keyword is extracted from each text. Each text in the preset text database corresponds to a respective phrase set. A phrase element in the respective phrase set is a phrase having a mapping relationship with a corresponding text.

Based on a each keyword which is extracted, a keyword table is established. A mapping relationship between each keyword and a phrase element in a phrase set corresponding to a text in which each keyword is located is the same as a mapping relationship between the text in which each keyword is located and the phrase element in the corresponding phrase set.

A keyword pair having an association relationship is determined in the keyword table. Phrase elements in a phrase set corresponding to each keyword in the keyword pair are updated. According to a mapping relationship between each keyword and phrase elements in an updated phrase set, a relationship chart between a keyword and a phrase is established.

The electronic device is also configured to match, in the keyword table, identical keywords and keywords whose semantic similarity meets a preset condition, and acquire a keyword pair having an association relationship; and update phrase elements in a phrase set corresponding to each keyword in the keyword pair to phrase elements to which all keywords in the keyword pair can be mapped.

The electronic device is also configured to delete, in the keyword table, a keyword whose word frequency is greater than a preset word frequency, and/or delete, in the keyword table, a keyword whose number of application fields is greater than a preset number.

The electronic device is also configured to establish, according to the mapping relationship between each keyword and the phrase elements in the updated phrase set, a connection line between each keyword and each phrase element to form a relationship chart.

The electronic device is also configured to delete, in the relationship chart, a mapping combination of a keyword and a phrase element between which the number of connection lines is smaller than a preset value.

The electronic device is also configured to segment the texts and calculate a first inverse document frequency of each word in a word segmentation result in all texts in the preset text database and a second inverse document frequency of the each word in a classification field corresponding to a text in which the each word is located; determine a respective importance parameter of the each word according to a word frequency of the each word in the text in which the each word is located, the first inverse document frequency, and the second inverse document frequency; and sort the respective importance parameter, and select, according to the sorting result, a preset number of words as keywords.

The electronic device is also configured to use the product of the word frequency of the each word in the text in which the word is located, the first inverse document frequency, and the second inverse document frequency as a respective importance parameter of the each word.

Computer program codes for performing the operations in the present disclosure may be written in one or more programming languages or a combination thereof. The preceding one or more programming languages include but are not limited to object-oriented programming languages such as Java, Smalltalk, and C++, as well as conventional procedural programming languages such as "C" or similar programming languages. The program codes may be executed entirely on a user computer, partially on a user's computer, as a stand-alone software package, partially on a user computer and partially on a remote computer, or entirely on a remote computer or a server. In the case of a remote computer, the remote computer may be connected to a user computer via any kind of network including a local area network (LAN) or a wide area network (WAN), or may be connected to an external computer (for example, via the Internet through an Internet service provider).

The flowcharts and block diagrams in the drawings show possible architectures, functions, and operations of the system, method, and computer program product according to the multiple embodiments of the present disclosure. In this regard, each block in the flowcharts or block diagrams may represent a module, a program segment, or part of codes that include one or more executable instructions for implementing specified logical functions. It is also to be noted that in some alternative implementations, the functions noted in the blocks may take an order different from the order noted in the drawings. For example, two sequential blocks may, in fact, be executed substantially in parallel, or sometimes executed in the reverse order, which depends on the involved functions. It is also to be noted that each block of the block diagrams and/or flowcharts and combinations of blocks in the block diagrams and/or flowcharts may be implemented by not only a specific-purpose hardware-based system that performs a specified function or action, but also a combination of specific-purpose hardware and computer instructions.

The described units involved in the embodiments of the present disclosure may be implemented by software or hardware. Each name of a respective unit does not constitute a limitation to the respective unit in a certain case. For example, a first acquisition unit may also be described as "a unit for acquiring at least two Internet Protocol addresses".

The functions described herein above may be performed at least in part by one or more hardware logic components. For example, without limitation, exemplary types of hardware logic components that may be used include Field Programmable Gate Array (FPGA), Application Specific Integrated Circuit (ASIC), Application Specific Standard Product (ASSP), System on Chips (SOC), and Complex Programmable Logical device (CPLD).

In the context of the present disclosure, a machine-readable medium may be a tangible medium that may contain or store a computer program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. Concrete examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the foregoing.

According to one or more embodiments of the present disclosure, example 1 provides a text processing method including the steps described below.

Multiple texts in a preset text database are acquired, and at least one keyword is extracted from each text. Each text in the preset text database corresponds to a respective phrase set. A phrase element in the respective phrase set is a phrase having a mapping relationship with a corresponding text.

Based on each keyword, a keyword table is established. A mapping relationship between each keyword and a phrase element in a phrase set corresponding to a text in which each keyword is located is the same as a mapping relationship between the text in which each keyword is located and the phrase element in the corresponding phrase set.

A keyword pair having an association relationship is determined in the keyword table. Phrase elements in a phrase set corresponding to each keyword in the keyword pair are updated. According to a mapping relationship between each keyword and phrase elements in an updated phrase set, a relationship chart between a keyword and a phrase is established.

According to one or more embodiments of the present disclosure, example 2 provides a method of example 1. The method includes the steps described below.

Determining the keyword pair having the association relationship in the keyword table and updating the phrase elements in the phrase set corresponding to each keyword in the keyword pair includes matching, in the keyword table, identical keywords and keywords whose semantic similarity meets a preset condition, and acquiring a keyword pair having an association relationship; and updating phrase elements in a phrase set corresponding to each keyword in the keyword pair to phrase elements to which all keywords in the keyword pair can be mapped.

According to one or more embodiments of the present disclosure, example 3 provides a method of example 1. The method includes the step described below.

Before updating the phrase elements in the phrase set corresponding to each keyword in the keyword pair, the method also includes at least one of deleting, in the keyword table, a keyword whose word frequency is greater than a preset word frequency, and/or deleting, in the keyword table, a keyword whose number of application fields is greater than a preset number.

According to one or more embodiments of the present disclosure, example 4 provides a method of example 1. The method includes the step described below.

Establishing, according to the mapping relationship between each keyword and the phrase elements in the updated phrase set, the relationship chart between the keyword and the phrase includes establishing, according to the mapping relationship between each keyword and the phrase elements in the updated phrase set, a connection line between each keyword and each phrase element to form a relationship chart.

According to one or more embodiments of the present disclosure, example 5 provides a method of example 4. The method includes deleting, in the relationship chart, a mapping combination of a keyword and a phrase element between which the number of connection lines is smaller than a preset value.

According to one or more embodiments of the present disclosure, example 6 provides a method of example 1. The method includes the steps described below.

Extracting the at least one keyword from the each text includes segmenting the each text into words and calculating a first inverse document frequency of each word in a word segmentation result in all texts in the preset text database and a second inverse document frequency of the each word in a classification field corresponding to a text in which the each word is located; determining a respective importance parameter of the each word according to a word frequency of the each word in the text in which the each word is located, the first inverse document frequency, and the second inverse document frequency; and sorting the respective importance parameter, and selecting, according to the sorting result, a preset number of words as keywords.

According to one or more embodiments of the present disclosure, example 7 provides a method of example 6. The method includes the step described below.

Determining the respective importance parameter of the each word according to the word frequency of the each word in the text in which the each word is located, the first inverse document frequency, and the second inverse document frequency includes using the product of the word frequency of the each word in the text in which the word is located, the first inverse document frequency, and the second inverse document frequency as a respective importance parameter of the each word.

According to one or more embodiments of the present disclosure, example 8 provides a text processing apparatus including a keyword extraction module, a word table builder, and a word relationship chart building module.

The keyword extraction module is configured to acquire multiple texts in a preset text database and extract at least one keyword from each text. Each text in the preset text database corresponds to a respective phrase set. A phrase element in the respective phrase set is a phrase having a mapping relationship with a corresponding text.

The word table builder is configured to establish, based on a each keyword, a keyword table. A mapping relationship between each keyword and a phrase element in a phrase set corresponding to a text in which each keyword is located is the same as a mapping relationship between the text in which each keyword is located and the phrase element in the corresponding phrase set.

The word relationship chart building module is configured to determine a keyword pair having an association relationship in the keyword table, update phrase elements in a phrase set corresponding to each keyword in the keyword pair, and establish, according to a mapping relationship between each keyword and phrase elements in an updated phrase set, a relationship chart between a keyword and a phrase.

According to one or more embodiments of the present disclosure, example 9 provides an apparatus of example 8. The apparatus includes the steps described below.

The word relationship chart building module is configured to match, in the keyword table, identical keywords and keywords whose semantic similarity meets a preset condition, and acquire a keyword pair having an association relationship; and update phrase elements in a phrase set corresponding to each keyword in the keyword pair to phrase elements to which all keywords in the keyword pair can be mapped.

According to one or more embodiments of the present disclosure, example 10 provides an apparatus of example 8. The apparatus includes the step described below.

The word table builder is configured to delete, in the keyword table, a keyword whose word frequency is greater than a preset word frequency, and delete, in the keyword table, a keyword whose number of application fields is greater than a preset number.

According to one or more embodiments of the present disclosure, example 11 provides an apparatus of example 10. The apparatus includes the step described below.

The word relationship chart building module is configured to establish, according to the mapping relationship between each keyword and the phrase elements in the updated phrase set, a connection line between each keyword and each phrase element to form a relationship chart.

According to one or more embodiments of the present disclosure, example 12 provides an apparatus of example 8. The apparatus includes the step described below.

The word relationship chart building module is configured to delete, in the relationship chart, a mapping combination of a keyword and a phrase element between which the number of connection lines is smaller than a preset value.

According to one or more embodiments of the present disclosure, example 13 provides an apparatus of example 12. The apparatus includes the steps described below.

The keyword extraction module is configured to segment the each text and calculate a first inverse document frequency of each word in a word segmentation result in all texts in the preset text database and a second inverse document frequency of the each word in a classification field corresponding to a text in which the each word is located; determine a respective importance parameter of the each word according to a word frequency of the each word in the text in which the each word is located, the first inverse document frequency, and the second inverse document frequency; and sort the respective importance parameter, and select, according to the sorting result, a preset number of words as keywords.

According to one or more embodiments of the present disclosure, example 14 provides an apparatus of example 13. The apparatus includes the step described below.

The keyword extraction module is also configured to use the product of the word frequency of the each word in the text in which the word is located, the first inverse document frequency, and the second inverse document frequency as a respective importance parameter of the each word.

It is to be noted that the preceding descriptions are only preferred embodiments of the present disclosure and the technical principles used therein. Those skilled in the art should understand that the disclosure scope involved in this disclosure is not limited to the technical solution formed by the specific combination of the preceding technical features, but covers, without departing from the preceding disclosed concepts, other technical solutions formed by any combination of the preceding technical features or their equivalent features, for example, a technical solution formed by replacing the preceding features with technical features with similar functions disclosed in (but not limited to) this disclosure.

Additionally, although multiple operations are described in a particular order, it is not a must to perform these operations in this particular order or in sequential order. In a certain environment, multitasking and parallel processing may be advantageous. Similarly, although multiple implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable subcombination.

What is claimed is:

1. A text processing method, comprising:
acquiring a plurality of texts in a preset text database, and extracting at least one keyword from each text of the plurality of texts, wherein each text in the preset text database corresponds to a respective phrase set, and a phrase element in the phrase set is a phrase having a mapping relationship with a corresponding text in the preset text database;
establishing, based on each keyword which is extracted, a keyword table, wherein a mapping relationship between the each keyword and a phrase element in a phrase set corresponding to a text in which the each keyword is located is identical to a mapping relationship between the text in which the each keyword is located and a phrase element in a corresponding phrase set; and
determining a keyword pair having an association relationship in the keyword table, updating a phrase element in a phrase set corresponding to each keyword in the keyword pair, and establishing, according to a mapping relationship between each keyword and a phrase element in an updated phrase set, a relationship chart between a keyword and a phrase.

2. The method of claim 1, wherein determining the keyword pair having the association relationship in the keyword table, updating the phrase element in the phrase set corresponding to each keyword in the keyword pair comprises:
matching, in the keyword table, identical keywords and keywords whose semantic similarity meets a preset condition, and acquiring a keyword pair having an association relationship; and
updating a phrase element in a phrase set corresponding to each keyword in the keyword pair to an phrase element to which all keywords in the keyword pair are capable of being mapped.

3. The method of claim 1, wherein before updating the phrase element in the phrase set corresponding to each keyword in the keyword pair, the method further comprises at least one of following steps:
deleting, in the keyword table, a keyword whose word frequency is greater than a preset word frequency, and deleting, in the keyword table, a keyword whose number of application fields is greater than a preset number.

4. The method of claim 1, wherein establishing, according to the mapping relationship between each keyword and the phrase element in the updated phrase set, the relationship chart between the keyword and the phrase comprises:
establishing, according to the mapping relationship between each keyword and the phrase element in the updated phrase set, a connection line between each keyword and a respective phrase element to form a relationship chart.

5. The method of claim 4, further comprising:
deleting, in the relationship chart, a mapping combination of a keyword and a phrase element between which a number of connection lines is smaller than a preset value.

6. The method of claim 1, wherein extracting at least one keyword from each text of the plurality of texts comprises:
segmenting each text into words, and calculating a first inverse document frequency of each word in a word segmentation result in all texts in the preset text database, and a second inverse document frequency of each word in a classification field corresponding to a text in which the each word is located;
determining an importance parameter of each word according to a word frequency of the each word in a text in which the each word is located, the first inverse document frequency, and the second inverse document frequency; and sorting the respective importance parameter, and selecting, according to a sorting result, a preset number of words as keywords.

7. The method of claim 6, wherein determining the importance parameter of each word according to the word frequency of the each word in the text in which the each word is located, the first inverse document frequency, and the second inverse document frequency comprises:
taking a product of the word frequency of the each word in the text in which the each word is located, the first inverse document frequency, and the second inverse document frequency as a respective importance parameter of the each word.

8. An electronic device, comprising:
one or more processors; and
a memory configured to store one or more programs; wherein
when the one or more programs are executed by the one or more processors, the one or more processors are caused to perform a text processing method,
wherein the text processing method comprises:
acquiring a plurality of texts in a preset text database, and extracting at least one keyword from each text of the plurality of texts, wherein each text in the preset text database corresponds to a respective phrase set, and a phrase element in the phrase set is a phrase having a mapping relationship with a corresponding text in the preset text database;
establishing, based on each keyword which is extracted, a keyword table, wherein a mapping relationship between the each keyword and a phrase element in a phrase set corresponding to a text in which the each keyword is located is identical to a mapping relationship between the text in which the each keyword is located and a phrase element in a corresponding phrase set; and
determining a keyword pair having an association relationship in the keyword table, updating a phrase element in a phrase set corresponding to each keyword in the keyword pair, and establishing, according to a mapping relationship between each keyword and a phrase element in an updated phrase set, a relationship chart between a keyword and a phrase.

9. A non-transitory computer storage medium, storing a computer program, when executing the computer program, a processor performs a text processing method,
wherein the text processing method comprises:
acquiring a plurality of texts in a preset text database, and extracting at least one keyword from each text of the plurality of texts, wherein each text in the preset text database corresponds to a respective phrase set, and a phrase element in the phrase set is a phrase having a mapping relationship with a corresponding text in the preset text database;
establishing, based on each keyword which is extracted, a keyword table, wherein a mapping relationship between the each keyword and a phrase element in a phrase set corresponding to a text in which the each keyword is located is identical to a mapping relationship between the text in which the each keyword is located and a phrase element in a corresponding phrase set; and
determining a keyword pair having an association relationship in the keyword table, updating a phrase element in a phrase set corresponding to each keyword in the keyword pair, and establishing, according to a mapping relationship between each keyword and a phrase element in an updated phrase set, a relationship chart between a keyword and a phrase.

10. The method of claim 2, wherein before updating the phrase element in the phrase set corresponding to each keyword in the keyword pair, the method further comprises at least one of following steps:
deleting, in the keyword table, a keyword whose word frequency is greater than a preset word frequency, and deleting, in the keyword table, a keyword whose number of application fields is greater than a preset number.

11. The electronic device of claim 8, wherein determining the keyword pair having the association relationship in the keyword table, updating the phrase element in the phrase set corresponding to each keyword in the keyword pair comprises:
matching, in the keyword table, identical keywords and keywords whose semantic similarity meets a preset condition, and acquiring a keyword pair having an association relationship; and
updating a phrase element in a phrase set corresponding to each keyword in the keyword pair to an phrase element to which all keywords in the keyword pair are capable of being mapped.

12. The electronic device of claim 8, wherein before updating the phrase element in the phrase set corresponding to each keyword in the keyword pair, the method further comprises at least one of following steps:
deleting, in the keyword table, a keyword whose word frequency is greater than a preset word frequency, and deleting, in the keyword table, a keyword whose number of application fields is greater than a preset number.

13. The electronic device of claim 8, wherein establishing, according to the mapping relationship between each keyword and the phrase element in the updated phrase set, the relationship chart between the keyword and the phrase comprises:
establishing, according to the mapping relationship between each keyword and the phrase element in the updated phrase set, a connection line between each keyword and a respective phrase element to form a relationship chart.

14. The electronic device of claim 13, wherein the method further comprises:
deleting, in the relationship chart, a mapping combination of a keyword and a phrase element between which a number of connection lines is smaller than a preset value.

15. The electronic device of claim 8, wherein extracting at least one keyword from each text of the plurality of texts comprises:
segmenting each text into words, and calculating a first inverse document frequency of each word in a word segmentation result in all texts in the preset text database, and a second inverse document frequency of each word in a classification field corresponding to a text in which the each word is located;
determining an importance parameter of each word according to a word frequency of the each word in a text in which the each word is located, the first inverse document frequency, and the second inverse document frequency; and
sorting the respective importance parameter, and selecting, according to a sorting result, a preset number of words as keywords.

16. The electronic device of claim 15, wherein determining the importance parameter of each word according to the word frequency of the each word in the text in which the each word is located, the first inverse document frequency, and the second inverse document frequency comprises:

taking a product of the word frequency of the each word in the text in which the each word is located, the first inverse document frequency, and the second inverse document frequency as a respective importance parameter of the each word.

17. The non-transitory computer storage medium of claim 9, wherein determining the keyword pair having the association relationship in the keyword table, updating the phrase element in the phrase set corresponding to each keyword in the keyword pair comprises:

matching, in the keyword table, identical keywords and keywords whose semantic similarity meets a preset condition, and acquiring a keyword pair having an association relationship; and updating a phrase element in a phrase set corresponding to each keyword in the keyword pair to an phrase element to which all keywords in the keyword pair are capable of being mapped.

18. The non-transitory computer storage medium of claim 9, wherein before updating the phrase element in the phrase set corresponding to each keyword in the keyword pair, the method further comprises at least one of following steps:

deleting, in the keyword table, a keyword whose word frequency is greater than a preset word frequency, and deleting, in the keyword table, a keyword whose number of application fields is greater than a preset number.

19. The non-transitory computer storage medium of claim 9, wherein establishing, according to the mapping relationship between each keyword and the phrase element in the updated phrase set, the relationship chart between the keyword and the phrase comprises:

establishing, according to the mapping relationship between each keyword and the phrase element in the updated phrase set, a connection line between each keyword and a respective phrase element to form a relationship chart.

20. The non-transitory computer storage medium of claim 19, wherein the method further comprises:

deleting, in the relationship chart, a mapping combination of a keyword and a phrase element between which a number of connection lines is smaller than a preset value.

* * * * *